United States Patent
Fujita

(10) Patent No.: US 7,035,296 B2
(45) Date of Patent: Apr. 25, 2006

(54) DATA TRANSMISSION SYSTEM USING AT CELLULAR PHONES

(75) Inventor: Tomoko Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 919 days.

(21) Appl. No.: 09/817,157

(22) Filed: Mar. 27, 2001

(65) Prior Publication Data

US 2001/0026562 A1 Oct. 4, 2001

(30) Foreign Application Priority Data

Mar. 28, 2000 (JP) .............................. 2000/088256

(51) Int. Cl.
*H04J 3/02* (2006.01)
(52) U.S. Cl. ...................................... 370/538; 379/130
(58) Field of Classification Search ................ 370/537, 370/352, 540, 201, 210, 484, 365, 494; 375/295, 375/229, 231, 211–222, 354–357, 260, 346; 725/54, 81, 118, 131, 85, 240.26; 707/10; 348/14–17, 423.1, 14.13, 480; 379/88.11, 379/189, 130, 406; 455/45, 116; 381/109
See application file for complete search history.

(56) References Cited

U.S. PATENT DOCUMENTS

| | | | | |
|---|---|---|---|---|
| 4,922,520 A | * | 5/1990 | Bernard et al. .......... | 379/88.11 |
| 5,319,702 A | * | 6/1994 | Kitchin et al. ............... | 379/189 |
| 5,361,297 A | * | 11/1994 | Ortiz et al. .................. | 379/130 |
| 5,398,281 A | * | 3/1995 | Kurokawa et al. ..... | 379/406.08 |
| 5,500,672 A | * | 3/1996 | Fujii ........................ | 348/14.13 |
| 5,523,795 A | * | 6/1996 | Ueda ........................... | 348/480 |
| 5,561,849 A | * | 10/1996 | Mankovitz .................... | 455/45 |
| 5,617,145 A | * | 4/1997 | Huang et al. ............. | 348/423.1 |
| 5,852,769 A | * | 12/1998 | Ahmed et al. .............. | 455/116 |
| 6,084,911 A | | 7/2000 | Ishikawa | |
| 6,181,693 B1 | * | 1/2001 | Maresca ...................... | 370/352 |

(Continued)

FOREIGN PATENT DOCUMENTS

EP 0 618 695 A2 3/1994

(Continued)

OTHER PUBLICATIONS

Zi-Li Zhang, et al., Smoothing, statistical multiplexing, and call admission control for stored video, Aug. 1997, Selected Areas in Communications, IEEE Journal on , vol.: 15, Issue: 6, pp.: 1148-1166.*

(Continued)

*Primary Examiner*—Chi Pham
*Assistant Examiner*—Prenell Jones
(74) *Attorney, Agent, or Firm*—McGinn IP Law Group, PLLC

(57) ABSTRACT

A data transmission system for cellular phones. A video data encoder encodes video data, and an audio data encoder encodes audio data. A video data storage unit stores encoded video data, and an audio data storage unit stores encoded audio data. A multiplexer multiplexes video data from the video data storage unit and audio data from the audio data storage unit. An audio signal detector measures the audio level of the inputted audio data and generates a data write control signal for controlling the video data encoder and the audio data encoder and an audio detected signal for controlling a multiplexing controller which generates a data read control signal for controlling the video data storage unit and the audio data storage unit and generates a data multiplexing control signal causing the multiplexer to output one of the video data, the audio data, and the multiplexed video and audio data.

12 Claims, 3 Drawing Sheets

U.S. PATENT DOCUMENTS

| | | | |
|---|---|---|---|
| 6,240,191 B1 * | 5/2001 | Yoon | 381/109 |
| 6,427,150 B1 * | 7/2002 | Oashi et al. | 707/10 |
| 6,504,850 B1 * | 1/2003 | Kato et al. | 370/465 |
| 6,588,014 B1 * | 7/2003 | Hayashi | 725/54 |
| 6,751,259 B1 * | 6/2004 | Zhang et al. | 375/240.26 |
| 6,754,241 B1 * | 6/2004 | Krishnamurthy et al. | 370/537 |

FOREIGN PATENT DOCUMENTS

| | | |
|---|---|---|
| EP | 0 917 365 A2 | 5/1999 |
| EP | 0 917 365 AA * | 5/1999 |
| JP | 05-167710 | 7/1993 |
| JP | 06-083391 | 3/1994 |
| JP | 07-154362 | 6/1995 |
| JP | 8-70363 | 3/1996 |
| JP | 08-083480 | 3/1996 |
| JP | 08-149430 | 6/1996 |
| JP | 9-130313 | 5/1997 |
| JP | 9-233231 | 9/1997 |
| JP | 10-229558 | 8/1998 |

OTHER PUBLICATIONS

Japanese Office Action dated May 19, 2005 (with partial English translation).

* cited by examiner

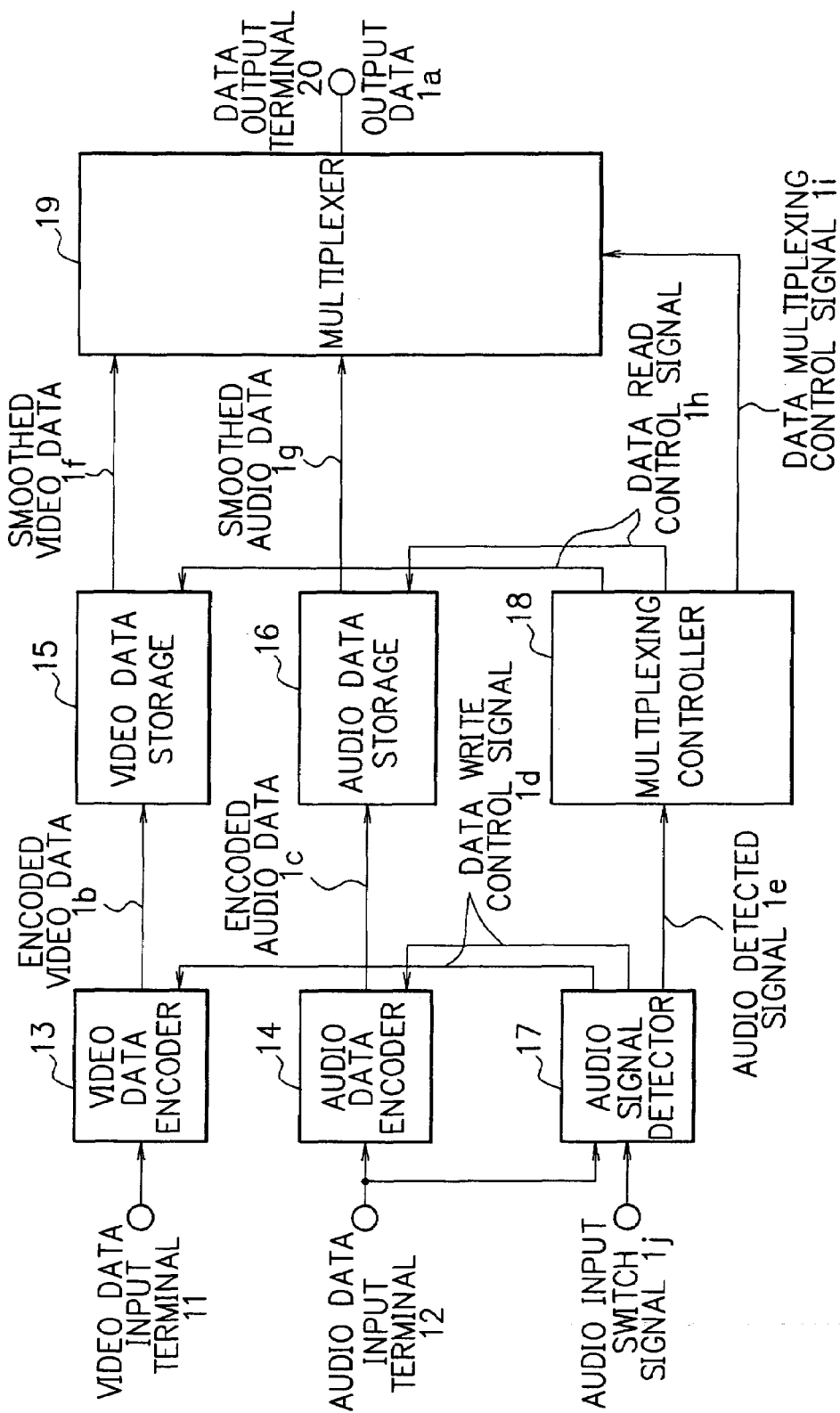

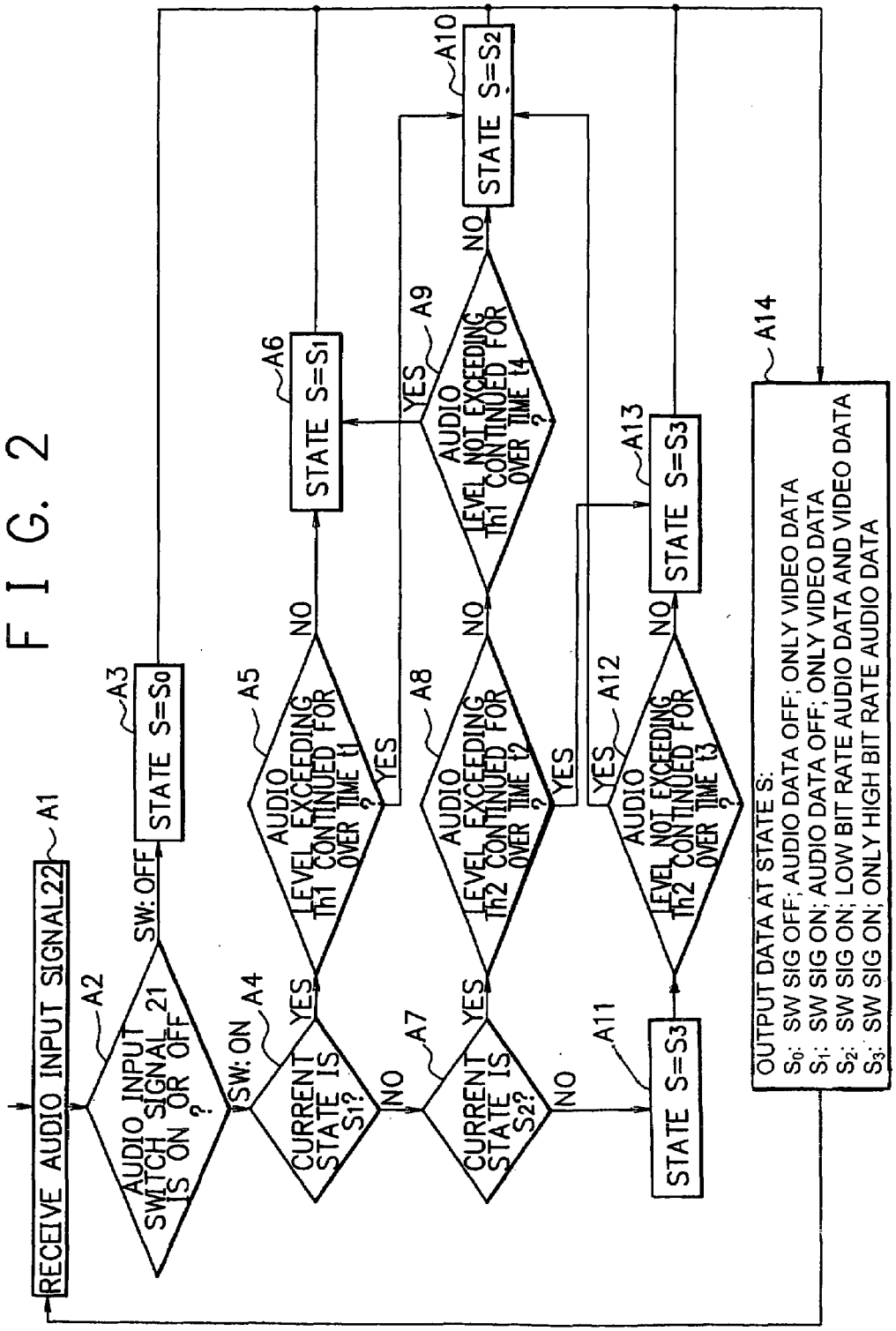

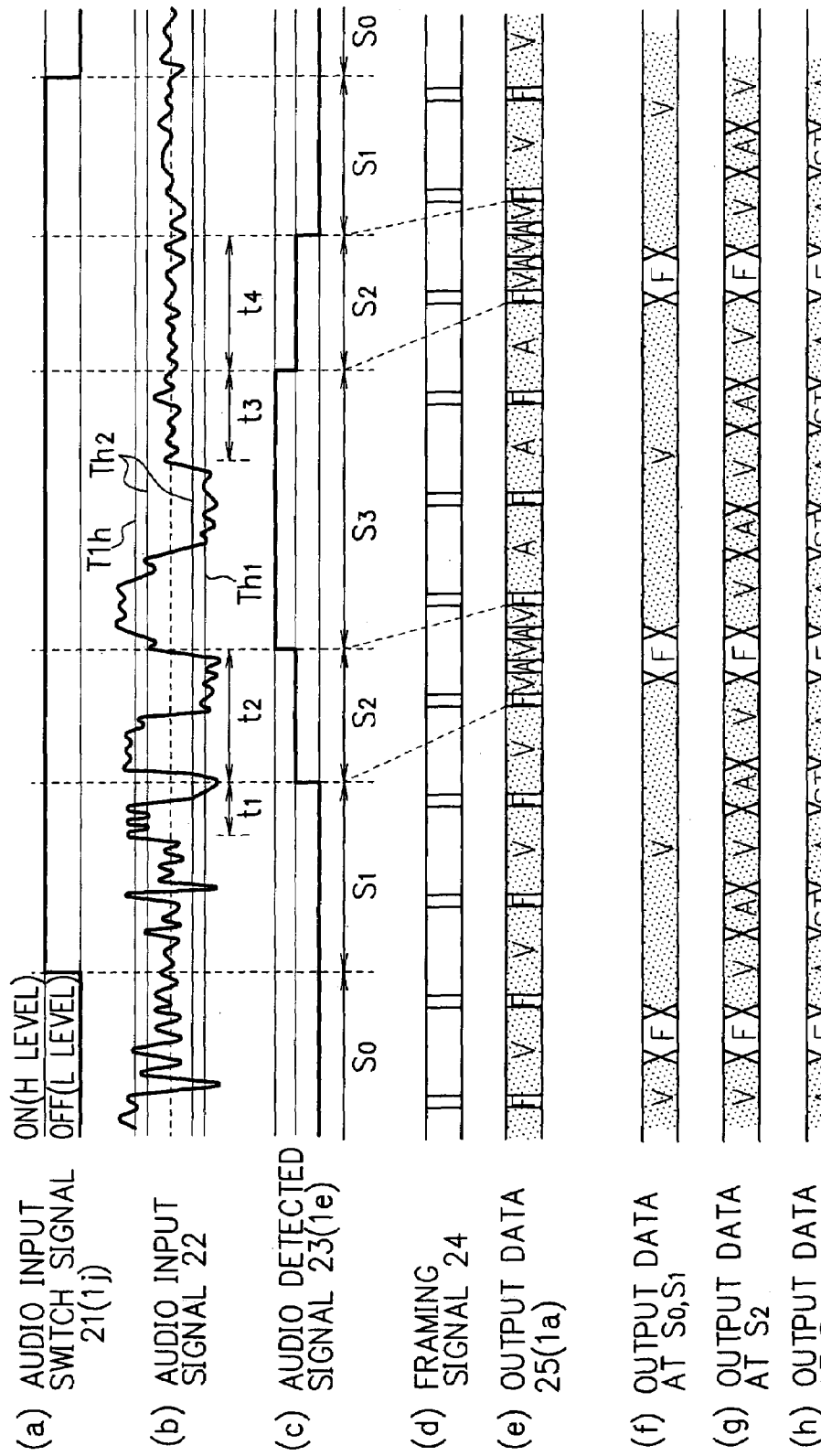

DATA TRANSMISSION SYSTEM USING AT CELLULAR PHONES

BACKGROUND OF THE INVENTION

The present invention relates to a data transmission system using at cellular phones, in particular, in which video data and audio data are transmitted.

DESCRIPTION OF THE RELATED ART

Cellular phones have rapidly become popular and various functions have been added to the cellular phones, and the usability of the cellular phones by users has become high. The Japanese Patent Application Laid-Open No. HEI 8-70363 discloses a transmitter and receiver of data multiplexed video and audio data. Generally, when both video data and audio data are transmitted at the same time through a telephone circuit being a narrow band transmission line to a cellular phone, both of video quality and audio quality are deteriorated. In order to solve this problem, at this application, when an audio level of the audio data is lower than a designated level, only the video data are transmitted, and when the audio level of the audio data is higher than the designated level, transmission of the video data is stopped and only the audio data are transmitted. For achieving this, at this application, a compressed video data outputting means, a compressed audio data outputting means, a transmitting means, and a manual switch for switching the output of the transmitting means are provided. And the transmitting means provides a data transmission control means, a switching means, a data switched to video data generating means, a data switched to audio data generating means, and a transmitting data storing means.

However, at the conventional technology mentioned above, when the audio level being more than the designated level is detected, the transmission of the video data is stopped and only the audio data are transmitted. Therefore, there is a problem that the transmission of the video data is frequently stopped, because the transmission of the video data is stopped even when a single sound such as noise is generated or a conversation for a short time is executed. Consequently this causes that the communication at the video and audio data telecommunication is interrupted.

SUMMARY OF THE INVENTION

It is therefore an object of the present invention to provide a data transmission system using at cellular phones, in which existing transmission lines having a designated transmission capacity can be used efficiently, and the quality of video and audio data to be transmitted can be improved.

According to the present invention, there is provided a data transmission system using at cellular phones. The data transmission system using at cellular phones provides a video data encoder that encodes inputted video data, an audio data encoder that encodes inputted audio data, video data storage that stores encoded video data outputted from the video data encoder, audio data storage that stores encoded audio data outputted from the audio data encoder, and a multiplexer that multiplexes smoothed video data outputted from the video data storage and smoothed audio data outputted from the audio data storage, and transmits multiplexed video and audio data. And the data transmission system using at cellular phones further provides an audio signal detector which audio signals of the inputted audio data and an audio input switch signal are inputted to, and a multiplexing controller. And the audio signal detector measures audio levels of the inputted audio signals and generates a data write control signal for controlling the video data encoder and the audio data encoder and also generates an audio detected signal for controlling the multiplexing controller. And the multiplexing controller generates a data read control signal for controlling the video data storage and the audio data storage, and also generates a data multiplexing control signal for controlling the multiplexer.

According to the present invention, the audio signal detector measures changes of the audio levels of the inputted audio signals in the passage of time. And the audio signal detector judges whether the audio levels exceeded predetermined one or more levels or not, and further measures one or more periods that the audio levels exceeded the predetermined one or more levels.

According to the present invention, the audio signal detector and the multiplexing controller work to transmit only the inputted video data regardless of the audio levels of the inputted audio signals, at the case that the audio input switch signal is OFF. And the audio signal detector and the multiplexing controller, at the case that the audio input switch signal is ON, work to control the encoded video data and a transmission bit rate of the encoded audio data in plural cases whether the audio levels of the inputted audio signals exceeded one or more predetermined levels and continued for one or more predetermined periods.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing a structure of a data transmission system using at cellular phones of the present invention;

FIG. 2 is a flowchart showing an output data controlling method at an audio signal detector at the embodiment of the data transmission system using at cellular phones of the present invention;

FIG. 3 is a diagram showing a waveform of audio input signals and a relation among an audio input switch signal, the audio input signals, an audio detected signal, a framing signal, and output data, at the embodiment of the data transmission system using at cellular phones of the present invention.

DESCRIPTION OF THE PREFERRED EMBODIMENT

Referring now to the drawings, an embodiment of the present invention is explained in detail. FIG. 1 is a block diagram showing a structure of a data transmission system using at cellular phones of the present invention. The data transmission system using at cellular phones of the present invention consists of a video data input terminal 11, an audio data input terminal 12, a video data encoder 13, an audio data encoder 14, video data storage 15, audio data storage 16, an audio signal detector 17, a multiplexing controller 18, a multiplexer 19, and a data output terminal 20.

The video data encoder 13 encodes video data inputted from the video data input terminal 11. The video data storage 15 stores video data encoded at the video data encoder 13. The audio data encoder 14 encodes audio data inputted from the audio data input terminal 12. The audio data storage 16 stores audio data encoded at the audio data encoder 14. The audio signal detector 17 always measures electric power of audio signals inputted from the audio data input terminal 12 and calculates their audio levels in the passage of time. And further the audio signal detector 17 outputs an audio detected signal 1*e* to the multiplexing controller 18 and a data write control signal 1*d* to the video data encoder 13 and the audio data encoder 14, based on the changes of the calculated audio levels in the passage of time and an audio input switch signal 1*j*. The multiplexing controller 18 is controlled by the audio signal detector 17 and controls so that output data from the video data storage 15 and the audio data storage 16 are smoothed and also controls the multiplexer 19. The multiplexer 19 receives a data multiplexing control signal 1*i* from the multiplexing controller 18, and multiplexes smoothed video data 1*f* from the video data storage 15 and smoothed audio data 1*g* from the audio data storage 16, and outputs multiplexed data to the data output terminal 20. And the data output terminal 20 outputs output data 1*a*.

Next, referring to FIG. 1, operation of the data transmission system using at cellular phones of the present invention is explained. Video data inputted from the video data input terminal 11 are encoded to digital data having a designated bit number at the video data encoder 13, and encoded video data 1*b* are outputted. And audio data inputted from the audio data input terminal 12 are encoded to digital data having a designated bit number at the audio data encoder 14, and encoded audio data 1*c* are outputted. And the audio data inputted from the audio data input terminal 12 are also inputted to the audio signal detector 17 as audio signals. The audio signal detector 17 always measures electric power of the audio signals inputted from the audio data input terminal 12. And the audio signal detector 17 outputs a data write control signal 1*d*, which instructs the video data encoder 13 and the audio data encoder 14 to write the encoded video data 1*b* in the video data storage 15 and the encoded audio data 1*c* in the audio data storage 16. And also the audio signal detector 17 outputs an audio detected signal 1*e* to the multiplexing controller 18, based on the changes of the audio levels in the passage of time and an audio input switch signal 1*j*. The multiplexing controller 18 outputs a data read control signal 1*h* to the video data storage 15 and the audio data storage 16 based on the audio detected signal 1*e* from the audio signal detector 17. The video data storage 15 outputs smoothed video data 1*f* to the multiplexer 19 based on the data read control signal 1*h*. And the audio data storage 16 outputs smoothed audio data 1*g* to the multiplexer 19 based on the data read control signal 1*h*. And the multiplexing controller 18 outputs a data multiplexing control signal 1*i* to the multiplexer 19 that controls whether data to be multiplexed are the video data and/or the audio data. The multiplexer 19 selects the video data and/or the audio data to be transmitted based on the data multiplexing control signal 1*i* from the multiplexing controller 18, and generates frames and multiplexes the selected data, and outputs multiplexed data to the data output terminal 20. And the data output terminal 20 outputs output data 1*a*.

Next, referring to FIGS. 2 and 3, a telecommunication control method of the video and audio data based on the audio signal detection at the audio signal detector 17 is explained. FIG. 2 is a flowchart showing an output data controlling method at the audio signal detector 17 at the embodiment of the data transmission system using at cellular phones of the present invention. FIG. 3 is a diagram showing a waveform of audio input signals 22 and a relation among an audio input switch signal 21 (1*j*), the audio input signals 22, an audio detected signal 23 (1*e*), a framing signal 24, and output data 25 (1*a*) at the embodiment of the data transmission system using at cellular phones of the present invention. In this explanation, the step number is the number shown in FIG. 2.

First, the audio signal detector 17 receives audio input signals 22 from the audio data input terminal 12 (step A1). Electric power of the audio input signals 22 (shown in FIG. 3 (b)) is always measured at the audio signal detector 17 and their audio levels are calculated. Next, an audio input switch signal 21 (1*j*) (shown in FIG. 3 (a)) is judged to be ON (H level) or OFF (L level) (step A2). At the case that the audio input switch signal 21 (1*j*) is OFF (step A2, SW:OFF), the state S is made to be $S_0$ signifying that the audio data are not transmitted (step A3). At this time, the output data is only video data.

Next, when the audio input switch signal 21 (1*j*) is switched to ON from OFF (step A2, SW:ON), it is judged whether the current state S is $S_1$ or not (step A4), in this, the state $S_1$ signifies the state that the audio data are not transmitted and only the video data are transmitted at the audio input switch signal 21 (1*j*) is ON. At the case that the current state S is $S_1$ (YES at the step A4), it is judged whether the calculated audio levels exceeding a designated level Th1, which is a level being recognized as a sound, continued for over at time t1 or not (step A5). At the case that the calculated audio levels did not exceed the designated level Th1 or the calculated audio levels exceeding the designated level Th1 did not continued for over the time t1 (NO at the step A5), the state S is still $S_1$ (step A6). At this case of the state $S_1$, it is judged that the audio data were not inputted, and only the video data are transmitted. At the case that the calculated audio levels exceeding the designated level Th1 continued for over the time t1 (YES at the step A5), the state S is made to be $S_2$ (step A10), and the audio data being a low bit rate and the video data are transmitted.

Next, it is judged whether the current state S is $S_2$ or not (step A7). At the case that the current state S is $S_2$ (YES at the step A7), it is judged whether the detected audio levels exceeding a designated level Th2 continued for over a time t2 (step A8). At the case that this judged result is YES at the step A8, the current state S is made to be $S_3$, and only audio data being a high bit rate are transmitted (step A13). At the case that this judged result is NO at the step A8, when the audio levels not exceeding the designated level Th1 did not continue for over a time t4 (NO at step A9), the state S is still $S_2$ (step the A10). And at the case that the audio levels not exceeding the designated level Th1 continued for over the time t4 (YES at the step A9), it is judged that a sound was not detected and the state S is made to be S1 (the step A6). Next, it is judged whether the current state S is $S_3$ or not (step A11). At the case of YES at the step A11, it is judged whether the audio levels not exceeding the designated level Th2 continued for over a time t3 or not (step A12). At the case of NO at the step A12, the state S is still $S_3$ (the step A13). At the case of YES at the step A12, that is, the audio levels not exceeding the designated level Th2 continued for over the time t3, the state S is made to be $S_2$ (the step A10). As mentioned above, the telecommunication control of the video and audio data are executed based on the judged results of the changes of the audio levels, inputted to the audio data input terminal 12, in the passage of time. In this, as shown in FIG. 3, that an audio level exceeds the designated level Th1 or Th2 signifies that the audio level exceeds either upper line or lower line of the designated level Th1 or Th2 in the upward direction or the downward direction.

Referring to FIG. 3, signals and data at the present invention are explained in more detail. In FIG. 3, (a)

signifies the audio input switch signal 21 (audio input switch signal 1*j* in FIG. 1) that is inputted to the audio signal detector 17 shown in FIG. 1, (b) signifies the audio input signals 22 that are inputted to the audio data input terminal 12 shown in FIG. 1 as audio signals, (c) signifies an audio detected signal 23 (the audio detected signal 1*e* in FIG. 1) that is outputted to the multiplexing controller 18 from the audio signal detector 17 shown in FIG. 1. Further, in FIG. 3, (d) signifies a framing signal 24 that is generated at the multiplexer 19 shown in FIG. 1, and (e) to (h) signify output data. The (e) is output data 25 (output data 1*a* shown in FIG. 1), (f) signifies output data at the time when the state S is $S_0$ and $S_1$, (g) signifies output data at the time when the state S is $S_2$, and (h) signifies output data at the time when the state S is $S_3$. As mentioned above, FIG. 3 shows operation and output data at the time when the audio input switch signal 21 and the audio input signals 22 shown in (a) and (b) are inputted to the audio signal detector 17 shown in FIG. 1.

Next, referring to FIGS. 1 and 3, operation of the embodiment of the data transmission system using at cellular phones of the present invention is explained. First, the audio input signals 22 (b) are inputted from the audio data input terminal 12. When the audio input switch signal 21 (1*j*) is OFF (L level), the state of the audio detected signal 23 (1*e*) is $S_0$. And only the encoded video data 1*b* from the video data encoder 13 are written in the video data storage 15 by the data write control signal 1*d* from the audio signal detector 17. Writing operation of the encoded audio data 1*c* to the audio data storage 16 from the audio data encoder 14 is stopped. The multiplexing controller 18 makes the video data storage 15 read out the smoothed video data 1*f* to the multiplexer 19 by using the data read control signal 1*h* based on the audio detected signal 1*e*, and also outputs the data multiplexing control signal 1*i* to the multiplexer 19. The multiplexer 19 generates the framing signal 24 (d) that adds a video and/or audio identification signal to the header of the data and generates frames and outputs the video data with frames by using the data multiplexing control signal 1*i* to the data output terminal 20. And the data output terminal 20 outputs the output data 25 (1*a*).

Next, the case, in which the audio input switch signal 21 (1*j*) is ON (H level), is explained. First, the audio signal detector 17 detects audio levels of the audio input signals 22. When the audio detected signal 23 (1*e*) is in the state $S_1$, at the same as the state $S_0$ mentioned above, the encoded video data 1*b* from the video data encoder 13 are written in the video data storage 15 by the data write control signal 1*d* from the audio signal detector 17. Writing operation of the encoded audio data 1*c* to the audio data storage 16 from the audio data encoder 14 is stopped. The multiplexing controller 18 makes the video data storage 15 read out the smoothed video data 1*f* to the multiplexer 19 by using the data read control signal 1*h* based on the audio detected signal 1*e*, and also outputs the data multiplexing control signal 1*i* to the multiplexer 19. The multiplexer 19 generates the framing signal 24 (d) that adds the video and/or audio identification signal to the header of the data and generates frames and outputs the video data with frames by using the data multiplexing control signal 1*i* to the data output terminal 20. And the data output terminal 20 outputs the output data 25 (1*a*).

As mentioned above, when the state S is only $S_0$ or $S_1$, the output data are only video data as shown in (f) in FIG. 3.

And when the audio detected signal 23 (1*e*) is in the state $S_2$, the encoded video data 1*b* from the video data encoder 13 are written in the video data storage 15 by the data write control signal 1*d* from the audio signal detector 17. And also the encoded audio data 1*c* being a low bit rate from the audio data encoder 14 are written in the audio data storage 16 by the data write control signal 1*d* from the audio signal detector 17. The multiplexing controller 18 makes the video data storage 15 read out the smoothed video data 1*f* and also makes the audio data storage 16 read out the smoothed audio data 1*g* to the multiplexer 19 by using the data read control signal 1*h* based on the audio detected signal 1*e*, and also outputs the data multiplexing control signal 1*i* to the multiplexer 19. The multiplexer 19 generates the framing signal 24 (d) that adds the video and/or audio identification signal to the header of the data and generates frames and outputs the video and audio data with frames by using the data multiplexing control signal 1*i* to the data output terminal 20. And the data output terminal 20 outputs the output data 25 (1*a*). At the case that the state S is only $S_2$, the output data are shown in FIG. 3 (g).

And when the audio detected signal 23 (1*e*) is the state $S_3$, the encoded audio data 1*c* being a high bit rate from the audio data encoder 14 are written in the audio data storage 16 by the data write control signal 1*d* from the audio signal detector 17. And writing the encoded video data 1*b* to the video data storage 15 from the video data encoder 13 is stopped. The multiplexing controller 18 makes the audio data storage 16 read out the smoothed audio data 1*g* to the multiplexer 19 by using the data read control signal 1*h* based on the audio detected signal 1*e*, and also outputs the data multiplexing control signal 1*i* to the multiplexer 19. The multiplexer 19 generates the framing signal 24 (d) that adds the video and/or audio identification signal to the header of the data and generates frames and outputs the audio data with frames by using the data multiplexing control signal 1*i* to the data output terminal 20. And the data output terminal 20 outputs the output data 25 (1*a*). At the case that the state S is only $S_3$, the output data are shown in FIG. 3 (h).

As shown in FIG. 2, at step A14, the output data are shown in the cases that the mentioned above state S is $S_0$, $S_1$, $S_2$, or $S_3$. With this, at the data transmission system using at cellular phones of the present invention, transmission lines in an existing transmission capacity can be used efficiently, and the quality of video and audio data to be transmitted can be improved.

As mentioned above, at the data transmission system using at cellular phones of the present invention, an audio signal detector is provided. And when the audio signal detector detects audio signals exceeding a designated audio level for over a designated time while video data are transmitting, transmission of audio data starts by a low bit rate, and multiplex telecommunication of the video data and the audio data is executed. With this, it is avoided that the transmission of the video data is stopped by a single sound. And at this state, when different audio signals exceeding another designated audio level are detected for over another designated time, the transmission of the audio data is executed by a high bit rate and the transmission of the video data is stopped, with this, the audio quality is improved. As mentioned above, the telecommunication control of the video data and the audio data to be transmitted is executed based on the changes of audio levels of inputted audio signals in the passage of time. Therefore, transmission lines in an existing transmission capacity can be used efficiently, and the quality of video and audio data to be transmitted can be improved.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A data transmission system for a cellular phone, said system comprising:
    a video data encoder that encodes inputted video data;
    an audio data encoder that encodes inputted audio data;
    a video data storage unit that stores the encoded video data;
    an audio data storage unit that stores the encoded audio data;
    a multiplexer that multiplexes video data outputted from said video data storage unit and audio data outputted from said audio data storage unit;
    a multiplexing controller; and
    an audio signal detector that measures the audio level of the inputted audio data and generates a data write control signal to control said video data encoder and said audio data encoder, and generates an audio detected signal to control said multiplexing controller,
    wherein said multiplexing controller is responsive to the audio detected signal to generate a data read control signal for controlling said video data storage unit and said audio data storage unit, and to generate a data multiplexing control signal for controlling said multiplexer so as to cause said multiplexer to output a selected one of the video data, the audio data, and the multiplexed video and audio data.

2. A data transmission system for a cellular phone in accordance with claim 1, wherein:
    said audio signal detector measures changes in the audio level of the inputted audio data with the passage of time.

3. A data transmission system for a cellular phone in accordance with claim 2, wherein:
    said audio signal detector judges whether the audio level exceeds one or more predetermined levels or not.

4. A data transmission system for a cellular phone in accordance with claim 3, wherein:
    said audio signal detector measures one or more time periods during which the audio level exceeds the predetermined one or more levels.

5. A data transmission system for a cellular phone in accordance with claim 1, wherein:
    said audio signal detector is adapted to receive an audio input switch signal, and said audio signal detector and said multiplexing controller are responsive to absence of the audio input switch signal to transmit only the inputted video data, regardless of the audio level of the inputted audio signal.

6. A data transmission system for a cellular phone in accordance with claim 1, wherein:
    said audio signal detector and said multiplexing controller are responsive to presence of an audio input switch signal to control the encoded video data and a transmission bit rate of the encoded audio data when the audio level of the inputted audio signal exceeds one or more predetermined levels for one or more predetermined periods.

7. A data transmission system for a cellular phone in accordance with claim 1, wherein said video data storage unit smoothes the encoded video data, and the audio data storage unit smoothes the encoded audio data.

8. A data transmission system for a cellular phone in accordance with claim 1, wherein:
    said audio signal detector judges whether the audio level exceeds one or more predetermined levels or not.

9. A data transmission system for a cellular phone in accordance with claim 8, wherein:
    said audio signal detector measures one or more time periods during which the audio level exceeds the predetermined one or more levels.

10. A data transmission system for a cellular phone in accordance with claim 5, wherein:
    said audio signal detector and said multiplexing controller are responsive to presence of the audio input switch signal to control the encoded video data and a transmission bit rate of the encoded audio data when the audio level of the inputted audio signal exceeds one or more predetermined levels for one or more predetermined periods.

11. A data transmission system for a cellular phone, said system comprising:
    means for encoding inputted video data;
    means for encoding inputted audio data;
    means for storing the encoded video data;
    means for storing the encoded audio data;
    means for multiplexing video data outputted from said video data storage unit and audio data outputted from said audio data storage unit;
    means for measuring the audio level of the inputted audio data and generating a data write control signal to control said video data encoding means and said audio data encoding means, and for generating an audio detected signal indicative of the measured audio level; and
    means responsive to the audio detected signal for generating a data read control signal for controlling storing of the video data and the audio data, and for generating a data multiplexing control signal for controlling said multiplexing means so as to cause said multiplexing means to output a selected one of the video data, the audio data, and the multiplexed video and audio data.

12. A data transmission method for a cellular phone, said method comprising:
    encoding inputted video data;
    encoding inputted audio data;
    storing the encoded video data;
    storing the encoded audio data;
    multiplexing the stored video data and the stored audio data;
    measuring the audio level of the inputted audio data;
    generating a data write control signal to control encoding of the inputted video data and the inputted audio data;
    generating an audio detected signal indicative of the measured audio level; and
    in response to the audio detected signal, controlling multiplexing of the stored video data and the stored audio data, generating a data read control signal for controlling storing of the encoded video data and the encoded audio data, and generating a data multiplexing control signal for controlling outputting of a selected one of the video data, the audio data, and the multiplexed video and audio data.

* * * * *